US 6,559,267 B2

(12) United States Patent
Kaufhold et al.

(10) Patent No.: US 6,559,267 B2
(45) Date of Patent: May 6, 2003

(54) MOULDINGS OF THERMOPLASTIC POLYURETHANES EXHIBITING REDUCED FOGGING

(75) Inventors: Wolfgang Kaufhold, Köln (DE); Hans-Georg Hoppe, Leichlingen (DE); Wolfgang Röhrig, Bergisch Gladbach (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/847,715

(22) Filed: May 2, 2001

(65) Prior Publication Data

US 2001/0056170 A1 Dec. 27, 2001

(30) Foreign Application Priority Data

May 10, 2000 (DE) .......................... 100 22 848

(51) Int. Cl.[7] .............................. C08G 18/34
(52) U.S. Cl. .......................... 528/76; 528/83
(58) Field of Search ...................... 528/83, 76

(56) References Cited

U.S. PATENT DOCUMENTS

| 4,182,898 A | * | 1/1980 | Fujiwara et al. | |
|---|---|---|---|---|
| 5,118,780 A | * | 6/1992 | Hirai et al. | |
| 5,210,170 A | | 5/1993 | Quiring et al. | 528/80 |
| 5,286,761 A | | 2/1994 | Naujoks et al. | 521/172 |
| 5,373,029 A | | 12/1994 | Naujoks et al. | 521/172 |
| 5,496,909 A | | 3/1996 | Mühlfeld et al. | 528/76 |
| 5,545,675 A | | 8/1996 | Loy et al. | 521/172 |
| 5,607,984 A | | 3/1997 | Duocastella-Codina et al. | 521/172 |

FOREIGN PATENT DOCUMENTS

| DE | 196 01 410 | | 7/1997 |
|---|---|---|---|
| DE | 19 611 670 | | 10/1997 |
| JP | 09012666 | * | 1/1997 |

OTHER PUBLICATIONS

Saunders, et al.; Polyurethanes, Part I, 1962, p. 283.*
Database WPI, Week 9606, Derwent Publications Ltd., London, GB; AN 1996–056029, XP002174981, "Thermoplastic Resin Composition for Durable Powder Moulding" & JP 07 316254 A (Nippon Polyurethane), Dec. 5, 1995, Zusammenfassung.
Database WPI, Week 9816, Derwent Publications Ltd., London, GB; AN 1998–174975, XP002174975, "Polyester Resin Composition for Powder Coating" & JP 10 036476 A (Nippon Yupika), Feb. 10, 1998, Zusammenfassung.

* cited by examiner

Primary Examiner—Rachel Gorr
(74) Attorney, Agent, or Firm—Joseph C. Gil; Aron Preis; James R. Franks

(57) ABSTRACT

A moulded article comprising thermoplastic polyurethane (TPU) that exhibits reduced fogging is disclosed. Characterized in having condensate value of <2 mg/10 g of TPU in accordance with the fogging test of DIN 75201B, the TPU is the product of reacting A) an organic diisocyanate, with
B) polyester polyol that contains less than 0.2% of 1:1 ring esters of dicarboxylic acid and diol and
C) a chain extender.

The moulded article is particularly suitable for use in the automotive sector.

7 Claims, No Drawings

MOULDINGS OF THERMOPLASTIC POLYURETHANES EXHIBITING REDUCED FOGGING

The invention relates to mouldings of thermoplastic polyurethanes (TPU) with reduced fogging behaviour.

Thermoplastic polyurethane elastomers have long been known. They are of industrial importance owing to the combination of high-grade mechanical properties with the known advantages of cost-effective thermoplastic processability. By using different chemical structural components, a wide range of variations in mechanical properties may be achieved. An overview of TPUs, their properties and applications is provided for example in Kunststoffe 68 (1978), pages 819 to 825 and Kautschuk, Gummi, Kunststoffe 35 (1982), pages 568 to 584.

TPUs are built up from linear polyols, generally polyester or polyether polyols, organic diisocyanates and short-chain diols (chain extenders). To accelerate the formation reaction, catalysts may be used. To adjust the properties, the structural components may be varied in relatively wide molar ratios. Molar ratios of polyols to chain extenders of from 1:1 to 1:12 have proven effective and result in products in the hardness range of from 70 Shore A to 75 Shore D.

TPUs may be produced continuously or discontinuously. The best known industrial production processes are the belt process (GB-A 1,057,018) and the extruder process (DE-A 1 964 834 and 2 059 570).

It is known (EP-A 579 988, DE-A 19 611 670) that the polyester polyols, which are used in the polyurethane field, contain low molecular weight cyclic compounds, which, when polyurethanes are used, result in the so-called "fogging effect". The "fogging effect" is a light-scattering effect which occurs as a result of the condensation of the primarily cyclic compounds which form on the internal faces of panes of glass. This is particularly disturbing in automobile construction, if the windows mist up as a result of fogging generated by the polyurethanes in the internal trim.

Current requirements relating to materials for use in internal motor vehicle trim are very complex. Due to requirements relating to heat or hot air stability, polyester polyols or mixtures of polyester polyols and polyether polyols are preferably used as the polyols for thermoplastic polyurethanes. It is known from flexible polyurethane foam production (EP-A 579 988) that substances also escape from polyester polyurethane foams which result in visible window deposits.

Reduced fogging behaviour is therefore an additional requirement for mouldings for internal automobile trim. Thus, a moulding condensate value (16 hrs at 120° C. to DIN 75201B) of less than 6 mg per 10 g TPU is required by some automobile manufacturers. Other manufacturers demand even lower condensate values for the mouldings.

The path proposed in DE-A 19 757 562 for reducing the condensate value of the TPU by passing hot gas (e.g. air) through the granulate for 5 to 20 hrs at 80° to 110° C. is unsuitable for TPUs containing polyether diols. When subjected to this hot gas treatment, the polyether-containing TPUs tend to change colour (e.g. from white to grey), which is disadvantageous in particular for use inside an automobile.

The object was therefore to provide mouldings of thermoplastic polyurethanes which exhibit low fogging values (measured to DIN 75201B at 120° C. over 16 hours) even after processing (compounding with dyestuffs and additives) and shaping (injection moulding, extrusion, powder-slush processes).

It is known from U.S. Pat. No. 5,545,675 and EP-A 579 988 that polyester diols and cyclic ring esters (main cause of fogging effect apart from additives) are in thermodynamic equilibrium. For this reason, after the distillation of polyester diols for production of ring ester-free polyester diols the cyclic ring esters may re-form again in the distillation residue, in particular at relatively high temperatures. It is known to physically remove the ring esters (EP-A 579 988) from the polyester polyol used by means of vacuum distillation using commercially available apparatus such as thin-film evaporator or short-path evaporator. In U.S. Pat. No. 5,545,675 and EP-A 579 988, reference is made to the fact that the polyester diol has to be cooled rapidly to temperatures of below 120° C. after leaving the distillation apparatus.

It was all the more surprising that the inventive TPU may be extruded at 180° to 240° C. and residence times of 30–90 seconds and yet exhibit low fogging values. No cycles (ring esters) apparently form during production of the inventive TPUs. It was also surprising that, even after compounding and shaping, wherein melt temperatures of 180–230° C. again occur with residence times of 30–120 seconds, TPU mouldings are obtained which likewise exhibit low fogging values.

The present invention provides a moulding containing TPU characterized in that it exhibits condensate values lower than 2 mg/10 g of TPU, determined according to DIN 75 201 at 120° C./16 hours. The inventive TPU is obtained by reacting, optionally in the presence of a catalyst, A) an organic diisocyanate, B) a polyester polyol having a number average molecular weight of 600 to 10 000 g/mol, and having a content of 1:1 ring ester of dicarboxylic acid and diol of less than 0.2 percent relative to the weight of said polyester polyol, and C) a chain extender having an average molecular weight of 60 to 500 g/mol, selected from the group consisting of diol and diamine wherein the equivalent ratio of A) to B) is 1.5:1.0 to 10.0:1.0 and the NCO index (calculated as the quotient of the equivalent ratio of isocyanate groups to the sum of the hydroxyl groups of polyol and chain extender multiplied by 100) is 95 to 105.

The TPU thus obtained may contain conventional auxiliary additives for their art-recognized functions.

Reactant B) may contain up to 80%, preferably up to 70%, relative to its weight, at least one member selected from the group consisting of polyether polyol and polycarbonate polyol, each having a number average molecular weight of 600 to 10 000, preferably 600 to 5 000. In a preferred embodiment, the content of 1:1 ring ester of dicarboxylic acid and diol characterizing reactant B) is less than 0.15 percent relative to the weight of polyester polyol.

The expression "1:1 ring ester of dicarboxylic acid and diol" means a reaction product of 1 mol dicarboxylic acid and 1 mol diol.

Thermoplastic polyurethanes with a condensate value of <2 mg/10 g of thermoplastic polyurethane in a fogging test according to DIN 75201B at 120° C. and 16 hours are preferably used.

Component A) may comprise aliphatic, cycloaliphatic, araliphatic, aromatic and heterocyclic diisocyanates or any mixtures of these polyisocyanates (c.f. HOUBEN-WEYL "Methoden der organischen Chemie", Vol. E 20 "Makromolekulare Stoffe", Georg Thieme Verlag, Stuttgart, New York, 1987, pp. 1587–1593 or Justus Liebigs Annalen der Chemie, 562, pages 75 to 136).

In detail, the following may be mentioned by way of example: aliphatic diisocyanates such as ethylene diisocyanate, 1,4-tetramethylene diisocyanate, 1,6-hexamethylene diisocyanate, 1,12-dodecane diisocyanate, cycloaliphatic diisocyanates such as isophorone diisocyanate, 1,4-cyclohexane diisocyanate, 1-methyl-2,4-cyclohexane diisocyanate and 1-methyl-2,6-cyclohexane diisocyanate together with the corresponding isomer mixtures, 4,4'-dicyclohexylmethane diisocyanate, 2,4'-dicyclohexylmethane diisocyanate and 2,2'-dicyclohexylmethane diisocyanate together with the corresponding isomer mixtures, also aromatic diisocyanates, such as 2,4-tolylene diisocyanate, mixtures of 2,4-tolylene diisocyanate and 2,6-tolylene diisocyanate, 4,4'-diphenylmethane diisocyanate, 2,4'-diphenylmethane diisocyanate and 2,2'-diphenylmethane diisocyanate, mixtures of 2,4'-diphenylmethane diisocyanate and 4,4'-diphenylmethane diisocyanate, urethane-modified liquid 4,4'-diphenylmethane diisocyanates or 2,4'-diphenylmethane diisocyanates, 4,4'-diisocyanato-1,2-diphenylethane and 1,5-naphthylene diisocyanate. 1,6-hexamethylene diisocyanate, 1,4-cyclohexane diisocyanate, isophorone diisocyanate, dicyclohexylmethane diisocyanate, diphenylmethane diisocyanate isomer mixtures with a 4,4'-diphenylmethane diisocyanate content of more than 96 wt. % and in particular 4,4'-diphenylmethane diisocyanate and 1,5-naphthylene diisocyanate are preferably used. The above-mentioned diisocyanates may be used individually or mixed together. They may also be used together with up to 15 mol % (calculated on the basis of total diisocyanate) of a polyisocyanate, but at most only so much polyisocyanate may be used as to produce a product which is still thermoplastically processable. Examples of polyisocyanates are triphenylmethane-4,4', 4"-triisocyanate and polyphenyl/polymethylene polyisocyanates.

Aliphatic or cycloaliphatic diisocyanates are preferred for applications with particularly high light stability requirements.

Component B) may comprise linear hydroxyl-terminated polyols with an average molecular weight of 600 to 10000 g/mol, preferably 600 to 5000 g/mol. As a result of the production process, these frequently contain small amounts of non-linear compounds. For this reason, they are often also spoken of as "substantially linear polyols".

Suitable polyester diols may be produced for example from dicarboxylic acids having 2 to 12 carbon atoms, preferably 4 to 6 carbon atoms, and polyhydric alcohols. Examples of suitable dicarboxylic acids are: aliphatic dicarboxylic acids, such as succinic acid, glutaric acid, adipic acid, suberic acid, azelaic acid and sebacic acid and aromatic dicarboxylic acids, such as phthalic acid, isophthalic acid and terephthalic acid. The dicarboxylic acids may be used individually or as mixtures, e.g. in the form of a succinic, glutaric and adipic acid mixture. To produce the polyester diols, it may optionally be advantageous to use, instead of the dicarboxylic acids, the corresponding dicarboxylic acid derivatives, such as carboxylic acid diesters with 1 to 4 carbon atoms in the alcohol residue, carboxylic acid anhydrides or carboxylic acid chlorides. Examples of polyhydric alcohols are glycols with 2 to 10, preferably 2 to 6 carbon atoms, such as ethylene glycol, diethylene glycol, 1,4-butanediol, 1,5-pentanediol, 1,6-hexanediol, 1,10-decanediol, 2,2-dimethyl-1,3-propanediol, 1,3-propanediol and dipropylene glycol. Depending on the desired properties, the polyhydric alcohols may be used alone or optionally mixed together. Preferred polyester diols are ethanediol polyadipates, 1,4-butanediol polyadipates, ethanediol/1,4-butanediol polyadipates, 1,6-hexanediol/neopentyl glycol polyadipates, 1,6-hexanediol/1,4-butanediol polyadipates. The polyester diols have average molecular weights of from 600 to 10,000, preferably 600 to 5000, and may be used individually or mixed together.

The content of the ring esters of the polyester diol is less than 0.2, preferably less than 0.15 percent relative to the weight of the diol. This content may be attained by distilling the polyester diol in units such as thin-film evaporator and short-path evaporator, both types being commercially available.

Also suitable are esters of carbonic acid with the above-mentioned diols (polycarbonate diols), in particular those with 4 to 6 carbon atoms, such as 1,4-butanediol or 1,6-hexanediol, condensation products of hydroxycarboxylic acids, for example hydroxycaproic acid, and polymerisation products of lactones, for example optionally substituted caprolactones.

Suitable polyether diols may be produced in that one or more alkylene oxides with 2 to 4 carbon atoms in the alkylene residue are reacted with a starter molecule, which contains two attached active hydrogen atoms. Examples of alkylene oxides are: ethylene oxide, 1,2-propylene oxide, epichlorohydrin and 1,2-butylene oxide and 2,3-butylene oxide. Ethylene oxide, propylene oxide and mixtures of 1,2-propylene oxide and ethylene oxide are preferably used. The alkylene oxides may be used individually, alternately one after the other or as mixtures. Starter molecules worthy of consideration are, for example: water, amino alcohols, such as N-alkyl-diethanolamines, for example N-methyldiethanolamine, and diols, such as ethylene glycol, 1,3-propylene glycol, 1,4-butanediol and 1,6-hexanediol. Mixtures of starter molecules may optionally also be used. Suitable polyether diols are additionally the hydroxyl group-containing polymerisation products of tetrahydrofuran. Trifunctional polyethers in proportions of from 0 to 30 wt. %, relative to the bifunctional polyethers, may also be used, but at most only in such an amount that a thermoplastically processable product is obtained. The substantially linear polyether diols have molecular weights of 600 to 10000, preferably 600 to 5000. They may be used both individually and mixed together.

Hydroxyl group-containing polymerisation products of tetrahydrofuran and polyether diols based on ethylene oxide and/or propylene oxide are particularly suitable.

These polyether diols have to be of such a quality that the condensate value of the TPU according to DIN 75209B (120° C., 16 hrs) does not exceed 2 mg/10 g TPU.

The chain extending agent C) comprises aliphatic diols or diamines with a molecular weight of 60 to 500, preferably aliphatic diols with 2 to 14 carbon atoms, such as for example ethanediol, 1,6-hexanediol, diethylene glycol, dipropylene glycol and in particular 1,4-butanediol, or (cyclo)aliphatic diamines, such as for example isophoronediamine, ethylenediamine, 1,2-propylenediamine, 1,3-propylenediamine, N-methylpropylene-1,3-diamine, N,N'-dimethylethylenediamine. Mixtures of the above-mentioned chain extenders may also be used. In addition, relatively small amounts of triols may also be added.

One particularly preferred chain extending agent is 1,6-hexanediol, optionally blended with up to 20 wt. % of a chain extender with an average molecular weight of 60 to 500 g/mol.

Aromatic diols and diamines may also be used as chain extending agent C). Examples of suitable aromatic diols are diesters of terephthalic acid with glycols having 2 to 4 carbon atoms, such as for example terephthalic acid bis-ethylene glycol or terephthalic acid bis-1,4-butanediol, hydroxyalkylene ethers of hydroquinone, such as for example 1,4-di(hydroxyethyl)hydroquinone, and ethoxylated bisphenols. Examples of suitable aromatic diamines are 2,4-tolylenediamine and 2,6-tolylenediamine, 3,5-diethyl-2,4-tolylenediamine and 3,5-diethyl-2,6-tolylenediamine and primary mono-, di-, tri- or tetraalkyl-substituted 4,4-diaminodiphenylmethane.

In addition, conventional monofunctional compounds may also be used in small quantities, e.g. as chain terminators or mould-release agents. Examples which may be mentioned are alcohols such as octanol and stearyl alcohol or amines such as butylamine and stearylamine.

Catalysts may be used in the production of thermoplastic polyurethanes by the extruder or belt processes. Suitable catalysts are conventional tertiary amines known according to the prior art, such as for example triethylamine, dimethylcyclohexylamine, N-methylmorpholine, N,N'-dimethylpiperazine, 2-(dimethylaminoethoxy)ethanol, diazabicyclo[2,2,2]octane and the like together with in particular organic metal compounds such as titanic acid esters, iron compounds, tin compounds, e.g. tin diacetate, tin dioctoate, tin dilaurate or the dialkyltin salts of aliphatic carboxylic acids such as dibutyltin diacetate, dibutyltin dilaurate or the like. Preferred catalysts are organic metal compounds, in particular titanic acid esters, iron or tin compounds. Dibutyltin dilaurate is very particularly preferred.

Auxiliary substances and/or additives may be added to the TPU in amounts of up to 20 wt. %, relative to the total quantity of TPU. They may be previously dissolved in one of the reactants, preferably in B), or added optionally after the reaction is complete in a downstream mixing unit, such as an extruder for example.

Examples worthy of mention are lubricants, such as fatty acid esters, the metal soaps thereof, fatty acid amides, fatty acid ester amides and silicone compounds, antiblocking agents, inhibitors, stabilisers acting with regard to hydrolysis, light, heat, and discolouration, flame retardants, dyestuffs, pigments, inorganic and/or organic fillers and reinforcing agents. Reinforcing agents are in particular fibrous reinforcing materials such as for example inorganic fibres, which are produced according to the prior art and may also be coated with a size. More details about the above-mentioned auxiliary substances and additives may be found in the specialist literature, for example J. H. Saunders, K. C. Frisch: "High Polymers", Vol. XVI, Polyurethane, parts 1 and 2, Interscience Publishers 1962 or 1964, R. Gächter, H. Müller (Ed.): Taschenbuch der Kunststoff-Additive, 3$^{rd}$ edition, Hanser Verlag, Munich 1989 or DE-A-29 01 774.

TPUs may also be produced by compounds of various TPUs, wherein it is not necessary for each individual TPU to fulfil all the corresponding property requirements.

The TPUs are used to produce the mouldings according to the invention, in particular to produce extrudates (e.g. films) and injection moulded articles. They are used particularly preferably in automobile interiors, due to their properties. Moreover, the TPUs may be used as sinterable powder for producing the mouldings according to the invention in the form of sheet products and hollow articles.

The invention will be described in more detail with the aid of the following Examples.

EXAMPLES

Distillation of the Polyester Diol

Suitable apparatus for performing the distillation is commercially available apparatus used under the names falling-film evaporator, thin-film evaporator or short-path evaporator for many applications in the chemical industry. Owing to the relatively high viscosity of the polyesters, devices of this type are preferred in which the product is distributed by a rotor evenly on the evaporator surface to yield a thin film.

Distillation of the polyester polyols PE225B and DE 2028 was performed at a temperature of 200° C. and a vacuum of 1–5 mbar. After distillation, the polyester diols PE225B and DE 2028 were cooled to room temperature.

The 1:1 ring ester largely responsible for "fogging" was determined using GLC before and after distillation of the polyester polyol.

1:1 ring ester content before distillation: 0.36 wt. % (relative to ester PE225B)

1:1 ring ester content after distillation: 0.09 wt. % (relative to ester PE225B).

The polyester diols (before and after distillation) were used in the production of the thermoplastic polyurethanes (TPUs).

TPU Production

The TPUs were produced continuously as follows:

A mixture of component B), component C), dibutyltin dilaurate, Irganox® 1010 and Stabaxol® P200 (for TPU composition see Table) was heated with stirring in a boiler to approx. 110° C. and mixed intensively together with a diisocyanate, which had likewise been heated to approx. 110° C. by means of heat exchangers, by a static mixer made by Sulzer (DN6 with 10 mixing elements and a shear rate of 500 s$^{-1}$) and then conveyed into the feed zone of a screw (ZSK 32).

The mixture reacted in the extruder (melt temperature 180–210° C.) until conversion was complete and was then pelletised.

All the pellets were subjected to the same drying cycle (1 hour at 90° C.), to ensure comparability of the condensate values.

DBTL: dibutyltin dilaurate

DE2020: 1,6-hexanediol-based polycarbonate diol with average molecular weight $\overline{M}_n$=2000 g/mol DE2028: Polydiol adipate based on hexane diol and neopentyl glycol with number average molecular weight $\overline{M}_n$=2000 g/mol PE 225B: Polybutanediol adipate with average molecular weight $\overline{M}_n$=2250 g/mol 1,4BDO: 1,4-butanediol Acclaim® 2220: Polyether polyol with polyoxypropylene/polyoxyethylene units (with approx. 85% primary hydroxyl groups and an average molecular weight $\overline{M}_n$ of approx. 2000 g/mol (Lyondell))

Terathane® 2000: Polytetrahydrofuran diol with $\overline{M}_n$=2000 g/mol (DuPont)

HDI: Hexamethylenediisocyanate

Irganox® 1010: Tetrakis[methylene-(3,5-di-tert-butyl-4-hydroxyhydrocinnamate)]methane (Ciba)

1,6 HDO: 1,6-hexanediol

Stabaxol® P200: Aromatic polycarbodiimide (Rhein-Chemie)

| | TPU Composition | | | | | | |
|---|---|---|---|---|---|---|---|
| | Diisocyanate | | Polyol 1 | | Polyol 2 | | 1,4 BDO | 1,6 HDO |
| TPU | moles | | moles | | moles | | moles | moles |
| Comparison 1 | 6.72 | HDI | 1.0 | DE2020 | 1.0 | DE2028 | 4.79 | — |
| Comparison 2 | 5.15 | HDI | 1.0 | PE225B | 0.43 | Acclaim ® 2220 | — | 3.53 |
| Comparison 3 | 2.67 | HDI | 1.0 | PE225B | — | — | 1.7 | — |
| Comparison 4 | 4.23 | HDI | 1.0 | PE225B | 0.25 | Terathane ® 2000 | — | 3.02 |
| Comparison 5 | 5.15 | HDI | 1.0 | PE225B | 0.43 | Terathane ® 2000 | — | 3.53 |
| Comparison 6 | 6.72 | HDI | 1.0 | PE225B | 1.0 | Acclaim ® 2220 | — | 4.79 |
| 1 | 6.72 | HDI | 1.0 | DE2020 | 1.0 | DE2028* | 479 | — |
| 2 | 5.15 | HDI | 1.0 | PE225B* | 0.43 | Acclaim ® 2220 | — | 3.53 |
| 3 | 2.67 | HDI | 1.0 | PE225B* | — | — | 1.7 | — |

*Polyester diols after distillation
All TPUs were produced with 40 ppm DBTL, related to polyols.

The TPUs Additionally Contain the Following Additives
1.0 wt. % Irganox® 1010 (related to the sum of A), B) and C)); 1.0 wt. % Stabaxol® P200 (related to polyester polyol Results

| TPU | Condensate in mg/10 g |
|---|---|
| Comparison 1 | 6.1 |
| Comparison 2 | 10.7 |
| Comparison 3 | 14 |
| Comparison 4 | 12 |
| Comparison 5 | 9.8 |
| Comparison 6 | 5.0 |
| TPU 1 | 1.4 |
| TPU 2 | 1.0 |
| TPU 2** | 1.4 |
| TPU 1* | 1.3 |
| TPU 3 | 1.1 |

*TPU 1 was made into rectangular injection-moulded sheets (125 mm × 50 mm × 1 mm) and these were used for determining condensate values.
**TPU 2 was extruded twice on a Brabender Plasti-Corder PL2000 and this pelletised material was used for determining condensate values.

The condensate values of the pelletised material and the injection-moulded sheet were measured to DIN 75201B at 120° C. over 16 hours.

Surprisingly, when distilled polyester diols were used, TPUs were obtained which exhibit condensate values even after synthesis at melt temperatures of 180–210° C. which fall below the limit of 2 mg per 10 g of TPU.

The values fall below this limit even when these TPUs are extruded again (extruded products, recycling) or processed by the injection moulding process.

It is also clear that partial replacement of the polyester diols by commercially available polyether diols, such as the hydroxyl group-containing polymerisation products of tetrahydrofuran (e.g. Terathane® 2000) or polyether diols based on ethylene oxide and propylene oxide (e.g. Acclaim® 2220) reduces the condensate value.

This again makes it clear that the polyester diols contribute substantially to the fogging effect.

For many applications in automobile interiors, pronounced hot air and heat stability (500 hrs at 120° C. with slight mechanical degradation) is necessary, for which reason TPUs based purely on polyethers are unsuitable and have to be used at least blended with polyester diols.

What is claimed is:

1. A moulded article comprising a thermoplastic polyurethane (TPU) that is the product of reacting, optionally in the presence of a catalyst:

A) at least one organic diisocyanate selected from the group consisting of hexamethylene diisocyanate, dicyclohexylmethane diisocyanate, and isophorone diisocyanate;

B) a mixture of 20 to 80%, relative to the weight of the mixture, of polyester polyol having a number average molecular weight of 600 to 5000 g/mol, and 20 to 80%, relative to the weight of the mixture, of polyetrahydrofuran diol having a number average molecular weight of 600 to 1500 g/mol, said mixture containing less than 0.2%, relative to the weight of polyester, of 1:1 ring esters of dicarboxylic acid and diol; and C) a chain extender in the form of a mixture of 80 to 100%, relative to the weight of C), of 1,6-hexanediol, and 0 to 20%, relative to the weight of C), of a chain extender having a number average molecular weight of 60 to 500 g/mol that is other than 1,6-hexanediol, wherein the equivalence ratio of diisocyanate A) to polyol B) is between 1.5:1.0 and 10.0:1.0, the NCO index is 95 to 105, and said TPU has a condensate value of <2 mg/log as determined in a fogging test according to DIN 75201B at 120° C. over 16 hours.

2. The article of claim 1 wherein said polyester polyol B) has a ring ester content of <0.15%.

3. The article of claim 1 wherein B) further contains at least one member having a number average molecular weight of 600 to 10 000 g/mol selected from the group consisting of polyether polyol and polycarbonate diol in an amount up to 80% relative to the weight of said polyester polyol.

4. The article of claim 1 wherein said TPU further contains conventional additives.

5. The article of claim 3 wherein said member having a molecular weight of 600 to 10,000 g/mole is present in an amount up to 70%, relative to the weight of said polyester polyol B).

6. The article of claim 1 wherein said organic diisocyanate A) is selected from hexamethylene diisocyanate and isophorone diisocyanate.

7. The article of claim 1 wherein said organic diisocyanate A) is hexamethylene diisocyanate.

* * * * *

UNITED STATES PATENT AND TRADEMARK OFFICE
CERTIFICATE OF CORRECTION

PATENT NO.    : 6,559,267 B2
DATED         : May 6, 2003
INVENTOR(S)   : Wolfgang Kaufhold et al.

It is certified that error appears in the above-identified patent and that said Letters Patent is hereby corrected as shown below:

<u>Column 8,</u>
Line 40, delete "mg/log" and insert -- mg/10 g --.

Signed and Sealed this

Ninth Day of September, 2003

JAMES E. ROGAN
*Director of the United States Patent and Trademark Office*